US012792058B1

(12) United States Patent
Pfrommer et al.

(10) Patent No.: US 12,792,058 B1

(45) Date of Patent: Nov. 10, 2026

(54) LEARNED IMPLICIT COORDINATION OF AUTONOMOUS MOBILE ROBOTS USING MACHINE LEARNING

(71) Applicant: Amazon Technologies, Inc., Seattle, WA (US)

(72) Inventors: Samuel Ian Pfrommer, Berkeley, CA (US); Andreas Kolling, North Andover, MA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 18/979,305

(22) Filed: Dec. 12, 2024

(51) Int. Cl.

| | |
|---|---|
| ***G05D 1/646*** | (2024.01) |
| ***G05D 1/622*** | (2024.01) |
| ***G05D 1/693*** | (2024.01) |
| ***G05D 101/15*** | (2024.01) |
| ***G05D 111/10*** | (2024.01) |

(52) U.S. Cl.

CPC ............. *G05D 1/646* (2024.01); *G05D 1/622* (2024.01); *G05D 1/693* (2024.01); *G05D 2101/15* (2024.01); *G05D 2111/17* (2024.01)

(58) Field of Classification Search

CPC ........ G05D 1/646; G05D 1/622; G05D 1/693; G05D 2101/15; G05D 2111/17

See application file for complete search history.

(56) References Cited

U.S. PATENT DOCUMENTS

2007/0293978 A1* 12/2007 Wurman ............ G05B 19/4189 700/213
2016/0236869 A1* 8/2016 Kimura ................ B65G 1/1378
2017/0010105 A1* 1/2017 Gdalyahu .............. G01C 21/30
2020/0379473 A1* 12/2020 Takahashi .............. B25J 9/0003
2021/0149382 A1* 5/2021 Stadie .................. B65G 1/0464
2021/0294350 A1* 9/2021 Konrardy ............... G06Q 10/20
2021/0295171 A1* 9/2021 Kamenev .................. G06T 7/20
2022/0114301 A1* 4/2022 Natarajan ............... G06F 30/27
2024/0078409 A1* 3/2024 Da Silva ................ G06N 20/00

(Continued)

FOREIGN PATENT DOCUMENTS

CN 120066055 A * 5/2025 ............. G05D 1/622
CN 121235060 A * 12/2025

(Continued)

OTHER PUBLICATIONS

CN-121235060-A translation (Year: 2025).*

(Continued)

*Primary Examiner* — Kyle T Johnson

(74) *Attorney, Agent, or Firm* — Kilpatrick Townsend & Stockton LLP

(57) ABSTRACT

Techniques described herein relate to learned implicit coordination of autonomous mobile robots (AMRs) using machine learning. For example, an AMR can detect, by a sensor of the AMR, sensor data indicating a state of an environment around the AMR. The AMR can generate, by at least using a trained machine learning model and based at least in part on the sensor data and a goal for the AMR, a trajectory for achieving the goal. The trained machine learning model can be generated by at least training a machine learning model on simulated trajectories for a set of AMRs that minimize a joint loss function across the set of AMRs. The AMR can execute at least an initial portion of the trajectory.

20 Claims, 10 Drawing Sheets

(56) References Cited

U.S. PATENT DOCUMENTS

| | | | | |
|---|---|---|---|---|
| 2024/0310851 | A1* | 9/2024 | Ebrahimi Afrouzi | G01S 17/87 |
| 2024/0311641 | A1* | 9/2024 | Alami | G05D 1/644 |

FOREIGN PATENT DOCUMENTS

| | | | | | |
|---|---|---|---|---|---|
| CN | 114842304 | B | * | 1/2026 | |
| CN | 121365358 | A | * | 1/2026 | |
| CN | 121596882 | A | * | 3/2026 | G05D 1/648 |
| WO | WO-2025147649 | A1 | * | 7/2025 | G06V 20/176 |

OTHER PUBLICATIONS

CN-120066055-A translation (Year: 2025).*
CN-121365358-A translation (Year: 2026).*
CN-114842304-B translation (Year: 2026).*
CN-121596882-A translation (Year: 2026).*

* cited by examiner

LEARNED IMPLICIT COORDINATION OF AUTONOMOUS MOBILE ROBOTS USING MACHINE LEARNING

BACKGROUND

Modern inventory systems, such as those in mail order warehouses, supply chain distribution centers, airport luggage systems, and custom-order manufacturing facilities, face significant challenges in responding to requests for inventory items. As inventory systems grow, the challenges of simultaneously completing a large number of packing, storing, and other inventory-related tasks becomes non-trivial. Some automated or semi-automated systems may utilize unmanned vehicles to perform certain tasks. These unmanned vehicles may rely on navigation rules, which can lead to unfavorable results. For instance, unmanned vehicles performing tasks in an automated inventory system may cease moving or may stop performing their assigned task if they are unable to determine next actions upon detecting an object or coming across an obstacle in their path.

BRIEF DESCRIPTION OF THE DRAWINGS

Various embodiments in accordance with the present disclosure will be described with reference to the drawings, in which.

DETAILED DESCRIPTION

Figure 1:
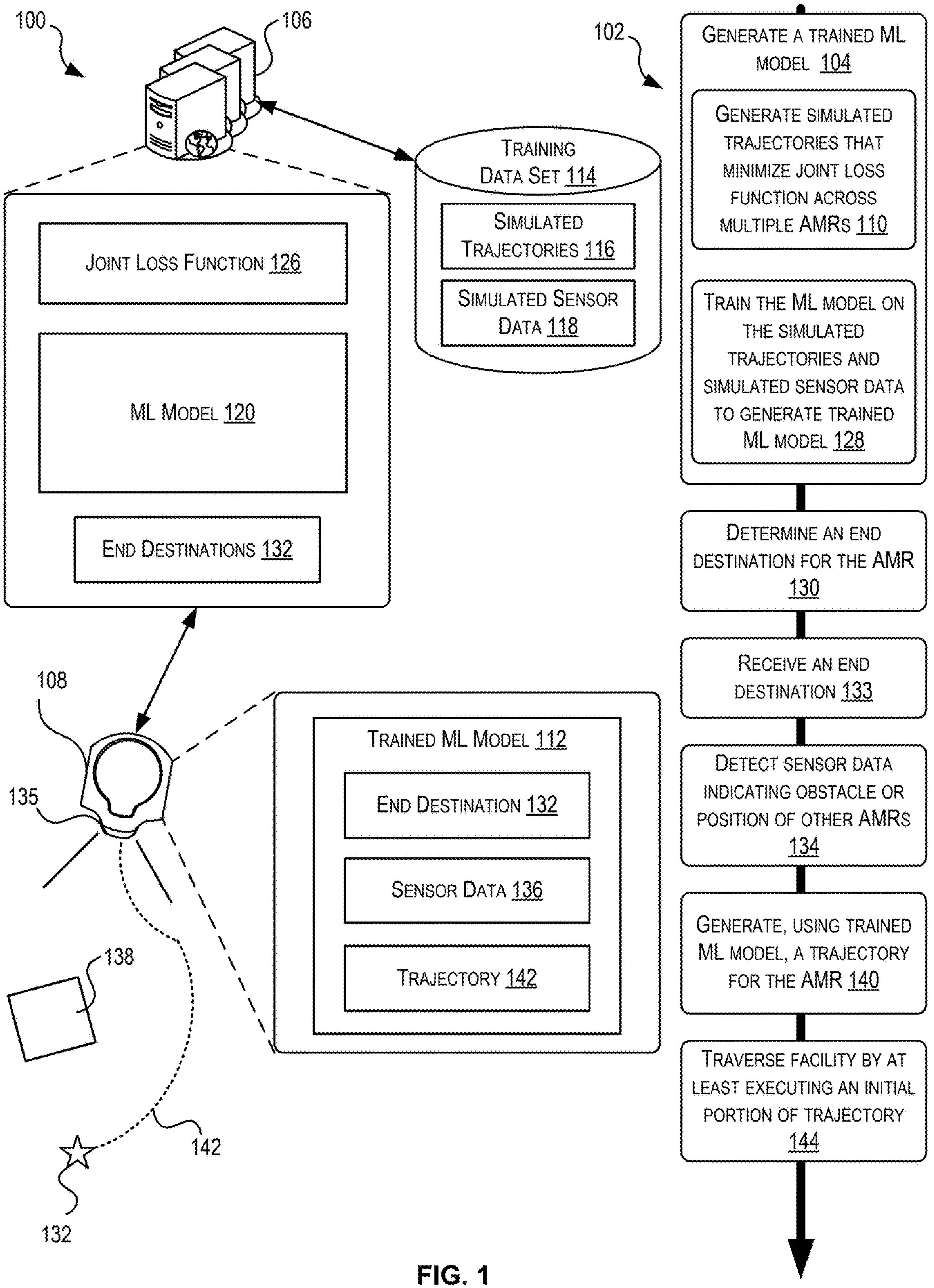
FIG. 1 is an example block diagram of a system and associated flowchart showing a process for implementing learned implicit coordination of autonomous mobile robots using machine learning, according to embodiments of the present disclosure.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments described herein are directed to, among other things, learned implicit coordination of autonomous mobile robots (AMRs) using machine learning. Learned implicit coordination can involve training a machine learning model to learn movement rules from simulated or historical data by replaying different trajectories in simulation. For example, training the machine learning model can involve generating simulated trajectories that satisfy desired trajectory characteristics that are encoded in a joint loss function across multiple simulated AMRs. The machine learning model can then be trained on the simulated trajectories that were generated via the joint loss function. Such a trained machine learning model can learn implicit rules that, when applied locally and during deployment (e.g., executed on-robot without explicitly communicating with other robots), can result in trajectory behaviors that appear similar to global coordination (e.g., having a centralized controller sending instructions to AMRs, with the AMRs using hard-coded rules to make local adjustments based on local sensor data).

Turning now to a particular example in a facility such as a warehouse or a factory, AMRs may traverse the facility to reach end destinations. Such AMRs may need to react to sensor data and their environment to prevent collisions, such as collisions with obstacles, other AMRs, etc. In some examples, the AMRs may not have low-latency, reliable communication with one another. AMRs may change trajectories quickly and unexpectedly based on sensor data and the environment, which can complicate the problem of coordination between AMRs. Rather than relying on hand-crafted rules for implicit coordination, or on communication for explicit coordination to define movement behavior, the AMRs may navigate using machine learning models trained in learned implicit coordination.

Learned implicit coordination may be superior to hand-crafted heuristics in the same way that deep learning is superior for image analysis or creation compared to hand-crafted heuristics from classical computer vision. Learned implicit coordination can encode the movement rules that an AMR follows when seeing other AMRs and an environment. The movement rules that are encoded (e.g., learned) can be derived from simulations or real data during a training phase for a machine learning model. During the training phase, the machine learning model may learn from historical or simulated trajectory and sensor data to minimize a loss function penalizing or rewarding behaviors. Optimization problems (e.g., minimize the loss function) may be solved to generate the simulated trajectories that demonstrate coordination. The trained machine learning model may be a diffusion model that can perform denoising to generate a trajectory subject to the local sensor data. After the training phase, when the trained machine learning model (which has learned aspects of the loss function) is executed on-robot, the trained machine learning model can perform trajectory generation without having to solve the original optimization problems. In some examples, after trajectory generation, another loss function or learned losses may be applied to score a set of generated trajectories to select an optimal trajectory from the set. The AMR behavior that results from trajectory generation performed by trained machine learning models that have learned implicit coordination can thus involve multi- AMR interactions that appear as global coordination, but are instead individually computed.

Embodiments of the present disclosure provide various technological advantages over conventional techniques for controlling AMR movement in a facility. For instance, centralized approaches, either at a fleet or group level, to resolving multi-AMR interactions often fail due to communication delays and latency issues. In some instances, any unforeseen disturbances or failures of a single drive or multiple drives may prevent the drives from strictly following a joint-global plan. Conventional techniques involving local coordination using only local sensor data typically use a combination of heuristics that are often not robust enough to handle many kinds of multi-AMR interactions. For instance, conventional techniques may struggle with policy interdependence, which means that the optimal action trajectory for each AMR may be dependent on other AMR actions. This can mean that naïve control strategies which predict other AMR future trajectories, and then optimize a trajectory based on such predictions can be intractable; the very process of selecting a trajectory can change what other AMRs will do. Further, the hard-coded heuristics may often conflict and result in deadlock or collision of AMRs. Deadlocked or collided AMRs may require manual intervention to disentangle the AMRs, and without prompt intervention there may be the possibility of further AMRs piling on and exacerbating the deadlock. Such deadlock or damage due to collisions may have cascading downstream effects, such as by negatively impacting the throughput of items (e.g., transported by AMRs) flowing through an inventory system.

In contrast, embodiments described herein utilize a learning-based approach that implicitly accounts for the expected behavior of other AMRs when planning using only local sensor data. For example, different AMRs, each executing their own trained machine learning model, can cooperate to form traffic lines, yielding at intersections, and even temporarily sacrificing progress towards their own goals to allow other AMRs to achieve their goals. This behavior may be difficult or even impossible to produce using hard-coded heuristics or conventional model-predictive control techniques, particularly in a wide range of circumstances in environments with unforeseen obstacles and/or other moving agents. Further, the AMRs executing the trained machine learning model described herein can maximize speed without violating "AMR safety system buffers" (e.g., a radius extending around each AMR). The solving of optimization problems (e.g., minimizing the loss function) may, in some examples, only be performed in the training phase. As solving optimization problems may be computationally expensive, at inference time when the trained machine learning model is executed on-robot to generate trajectories using local sensor data, the trained machine learning model perform trajectory generation without solving the original optimization problem. Thus, trajectories can be generated on-robot using locally sensed data quickly enough for AMRs to react to sudden environmental changes.

Turning now to the figures, FIG. 1 is an example block diagram of a system 100 and associated flowchart showing a process 102 for implementing learned implicit coordination of autonomous mobile robots (AMRs) 108 using machine learning, according to embodiments of the present disclosure. The system 100 includes devices, objects, and the like that correspond to the process 102. The process 102 can be performed by a computer system 106 or an AMR 108.

Figure 9:
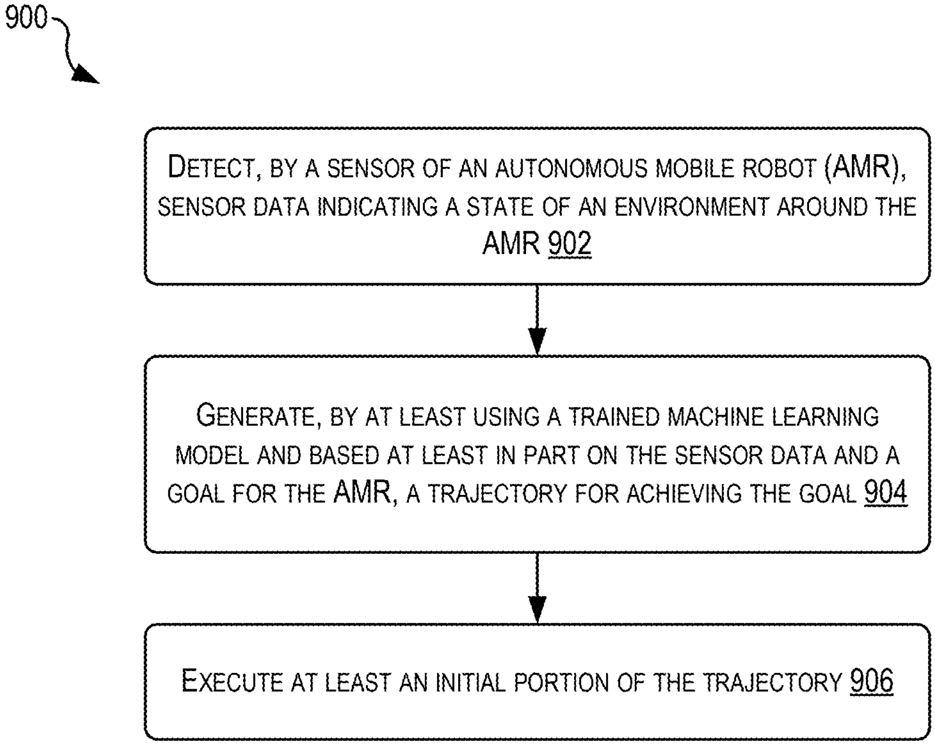
FIG. 9 illustrates an example flowchart showing a process for implementing techniques related to using machine learning for implicit learned coordination of autonomous mobile robots, according to embodiments of the present disclosure.

FIGS. 1 and 9 illustrate example flow diagrams showing respective processes 102 and 900, as described herein. The processes 102 and 900 are illustrated as logical flow diagrams, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be omitted or combined in any order and/or in parallel to implement the processes.

Some or all of the processes 102 and 900 (or any other processes described herein, or variations, and/or combinations thereof) may be performed under the control of one or more computer systems configured with executable instructions and may be implemented as code (e.g., executable instructions, one or more computer programs, or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The process 102 may begin at block 104 by the computer system 106 generating a trained machine learning model 112 by training a machine learning model 120. The machine learning model 120 may, in some examples, be a diffusion model. Diffusion models can denoise noisy images; after training, a diffusion model can "sample" a new image by iteratively denoising random Gaussian noise.

To train a conventional diffusion model, training can start with a forward diffusion process $$q(x_t \mid x_t - 1) := N\left(x_t; \sqrt{1-\beta_t}\, x_{t-1}, \beta_t I\right),$$

where N can denote a normal distribution and $\beta_t$ can be a noise schedule. Effectively, $q(x_t|x_{t-1})$ can take in an image $x_{t-1}$ and can add a small amount of Gaussian noise. At training time, the conventional diffusion model can sample a clean image $x_0$ from a dataset and add noise to it via q. Then, the conventional diffusion model can be trained via a learned reverse diffusion process $p_\theta(x_{t-1}|x_t)$, parameterized by $\theta$, which can denoise a noisy image. Concretely, a network $f_\theta(x_t)\approx x_0$ can be constructed which takes in a noisy image and attempts to predict the original noise-free image. The reverse diffusion process $p_\theta$ can then be defined in terms of the denoiser $f_\theta$. After training $f_\theta$ to denoise images, at inference time, pure Gaussian noise $xT \sim N(x_T; 0, I)$ can be sampled. The denoiser $f_\theta$ can be applied for T timesteps. The conventional diffusion model can be conditioned on a text embedding to get user-specific images. To accomplish this, a training dataset containing pairs of images $x_0$ and associated text metadata y can be used. For instance, y can be fed into the diffusion denoiser at training time $f_\theta(x_t, y)$ to provide a signal for what kind of image is to be produced. For inference, a y can be provided and fed into every step of the reverse diffusion process.

The machine learning model 120 described herein can be adapted from a conventional diffusion model to generate robot trajectories. The machine learning model 120 can be trained using a training data set 114 of simulated trajectories 116 paired with simulated sensor data 118 to denoise random Gaussian noise, as is described in further detail below in blocks 110 and 128. The training data set 114 may in some examples include historical data (e.g., historical trajectories 121 and historical sensor data 123) collected from AMRs performing learned implicit coordination. Additionally or alternatively, the training data set 114 may include simulated data (e.g., simulated trajectories 116 and simulated sensor data 118), as prior to implementing learned implicit coordination on-robot, such a large-scale data set may not yet exist.

At block 110, the computer system 106 can generate, based at least in part on simulated sensor data 118 for a set of AMRs (e.g., simulated AMRs), a set of simulated trajectories 116 for individual AMRs of the set of AMRs. The simulated trajectories 116 may minimize a joint loss function 126 across the set of AMRs. That is, the simulated trajectories 116 may be trajectories that collectively satisfy the joint loss function 126, which may encode penalties or behaviors that result in implicit learned behavior. The joint loss function 126 can be a weighted sum of several terms. Example loss terms can include avoidance of other AMRs, avoidance of obstacles, minimizing distance between current location and end destination, smooth motion, etc.

At block 128, the computer system 106 can train the machine learning model 120 on the set of simulated trajectories 116 and the simulated sensor data 118. Thus, the machine learning model 120 can learn from the simulated trajectories 116 to generate trajectories that result in implicit learned coordination behavior. In some examples, the machine learning model 120 may also be trained on the set of historical trajectories 121 and the historical sensor data 123. While being trained, the machine learning model 120 can generate trajectories for other AMRs of the set of AMRs while optimizing trajectory generation for a particular (e.g., ego) AMR. This is further described below in relation to FIG. 3. The machine learning model 120 can include a diffusion denoiser that can operate over an entire trajectory simultaneously, such as by treating the trajectory as an "image" with a time axis and a state axis. For example, starting with a clean trajectory (e.g., an initial trajectory), add randomness can be added to every element of the tensor for the clean trajectory. The machine learning model 120 can be trained to predict the original denoised trajectory. In some examples, the notion of time for the machine learning model 120 can be real-world time over the planning horizon $H \in N$, and can be distinct from time in the diffusion process. In some examples, machine learning model 120 can denoise action trajectories $u=[u_0, \ldots u_{H-1}]$, such as in cases where AMRs admit a closed-form representation, as action trajectories can be forwards-integrated to produce dynamically feasible state-space trajectories.

As in image diffusion, unconditional trajectory generation may not be useful, and thus the generation of a trajectory can be conditioned on a particular goal (e.g., "the trajectory should end at this position"). The conditioning labels for the machine learning model 120 can be the simulated sensor data 118 and associated end destinations and/or the historical sensor data 123. In some examples, the conditioning labels may be any other suitable instructions, such as driving instructions or anything that may bias trajectory generation toward a specific type of trajectory.

At block 130, the computer system 106 can determine end destinations 132 for individual AMRs that are traversing a facility. For example, the computer system 106 can execute a workflow coordinator that can coordinate tasks for the individual AMRs. When an AMR, such as AMR 108, is assigned a particular task at a particular location, the computer system 106 can transmit a command to the AMR 108 to navigate to the particular location (e.g., end destination 132). The AMR 108 may navigate to the end destination 132 by executing its onboard trained machine learning model 112 to generate trajectories based on local sensor data, which is described in further detail below in relation to blocks 133, 134, 140, and 144. Blocks 133, 134, 140, and 144 can be performed by the AMR 108.

At block 133, the AMR 108 can receive an end destination 132 for the AMR 108 in the facility from the computer system 106. In some examples, the AMR 108 may have a global map that can be used by the AMR 108 to navigate to the end destination 132. At block 134, the AMR 108 can detect, by a sensor 135 on the AMR 108, sensor data 136 that indicates at least one of a position of an obstacle 138 or one or more other AMRs in the facility. The sensor data 136 can be image data, point-cloud data, or any suitable data that can represent the position of nearby objects.

At block 140, the AMR 108 can generate, by at least using the trained machine learning model 112 and based at least in part on the sensor data 136 and the end destination 132, a trajectory 142 for the AMR 108. The trained machine learning model 112 can be a trained denoising diffusion model that can iteratively denoise a Gaussian-sampled trajectory into a plausible trajectory 142, conditioned on the sensor data 136 and the end destination 132. Due to its training, the trained machine learning model 112 can use the engineered losses that encoded desired outcomes during training time to combine with the sensor data 136 to generate the trajectory 142. For example, the trained machine learning model 112 may score generated trajectories based on the engineered losses from training time to select the most optimal trajectory 142.

At block 144, the AMR 108 can traverse the facility by at least executing an initial portion of the trajectory 142. The trajectory 142 may include both a route and a speed at which to traverse the route. The AMR 108 may execute the trajectory 142 until, for example, updated sensor data 136 is detected. Thus, the trained machine learning model 112 may continue to generate trajectories based on updated environmental factors. Because the trained machine learning model 112 is accessing previously generated engineered losses learned from training time, rather than performing lengthy optimization to generate each trajectory, the AMR 108 may update trajectory behavior in real time to accommodate moving obstacles such as other AMRs 108. Other AMR 108 that are also executing trained machine learning models to navigate the facility may implicitly coordinate with the AMR 108 as though controlled via a centralized controller, but may still be independently and autonomously controlled.

Figure 2:
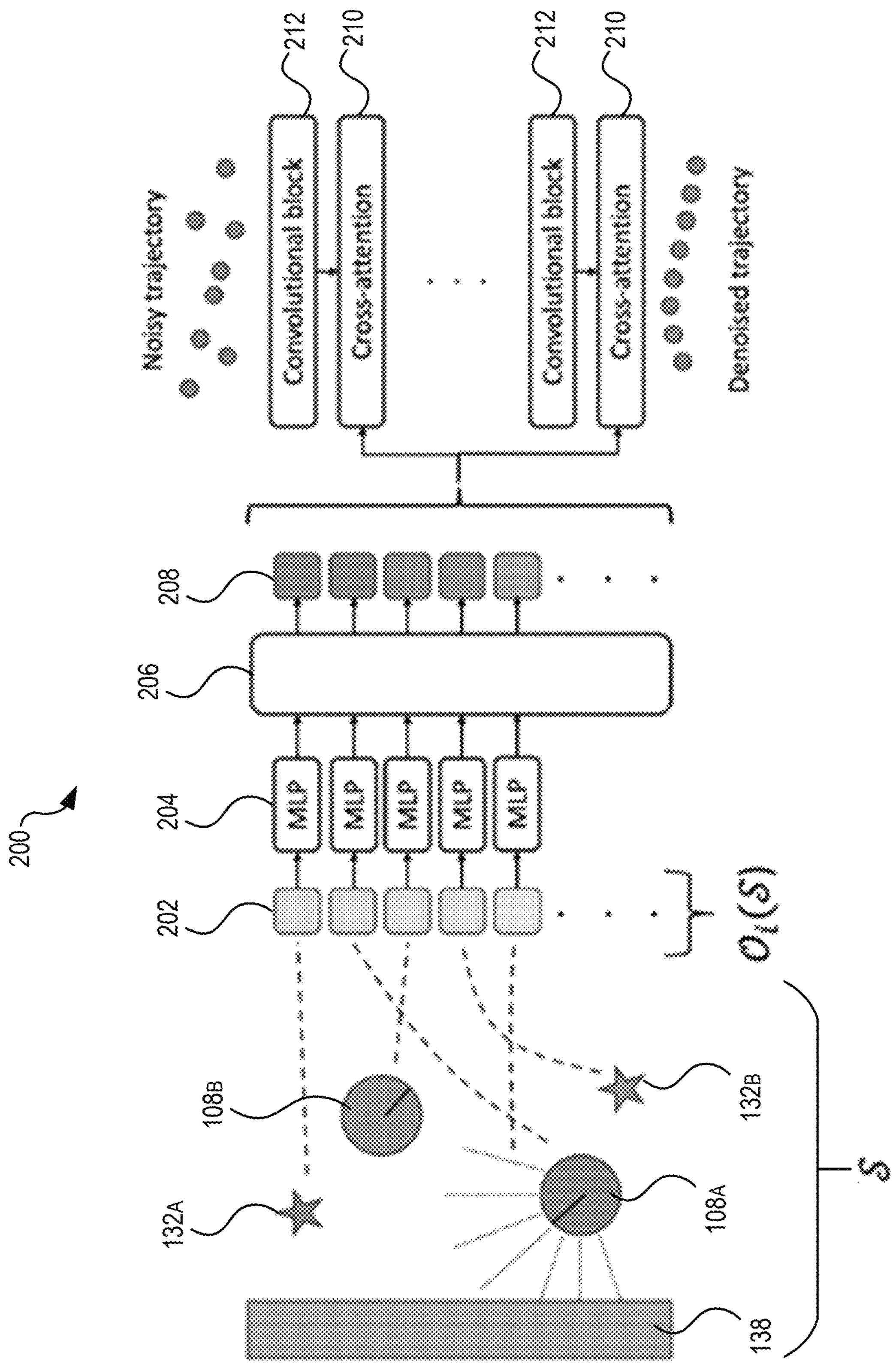
FIG. 2 illustrates an example architecture of a machine learning model used to implement learned implicit coordination of autonomous mobile robots, according to embodiments of the present disclosure.

FIG. 2 illustrates an example architecture of a machine learning model 200 used to implement learned implicit coordination of autonomous mobile robots, according to embodiments of the present disclosure. The machine learning model 200 can be an example of the machine learning model 120 (e.g., during training time) and/or the trained machine learning model 112 (e.g., after training) of FIG. 1.

The setting for the machine learning model 200 can be formulated as an open-loop control problem over time horizon H. Ultimately, the loop can be closed by continually replanning in a receding-horizon fashion. An assumption can be made that good open-loop trajectories can generally be sufficient for good closed-loop controller performance, as the setting can involve cooperation of agents (e.g., AMRs in a facility). Open-loop planning in an adversarial situation may be less practical.

The setting may include one or more AMRs 108*a-b* navigating a facility, which may also include obstacles 138. The machine learning model 200 can be executed by the first AMR 108*a* to generate a trajectory for the first AMR 108*a*. Each of the AMRs 108*a-b* may have an associated end destination 132*a-b* to which the AMRs 108*a-b* are traversing. The state of an AMR 108, or i, at time t∈0, . . . H can be denoted as $$x_t^i$$

$\in \mathbb{R}^5$, with the specific elements including position x and y, heading x and y, and velocity. The heading vectors can be normalized to have norm 1. In some examples, a heading vector can be used instead of an angle to avoid having to handle wraparound issues at 2π. Each drive can be provided their goal position (e.g., end destination 132) denoted by $g^i \in \mathbb{R}^2$, which the specific elements including position x and y. Further, the representation of permanent obstacles 138 can be denoted as M. In some examples, M can be an occupancy-grid representation, a point cloud, a polygonal map, or any other suitable representation of obstacles. A scenario S can then consist of an instantaneous snapshot of AMR driving states and end destinations 132*a-b* to map $$S = \langle x_0^1, \ldots, x_0^N, g^1, \ldots g^N, M \rangle.$$

In some examples, random scenarios can also be generated from some distribution S~PS; for example, by randomly setting drive positions and goals. Each AMR i can have a collection of local observations $O_i(S)$ of a scenario from its vantage point at $$x_0^1.$$

The concatenation of states and controls for an ith drive over the horizon H can be denoted using:

$$x^i = [x_0^i, \ldots, x_H^i] \text{ and } u^i = [u_0^i, \ldots, u_{H-1}^1].$$

In some examples, u−1 can be used to denote the collection of control trajectories for all AMRs besides AMR i.

In some examples, the AMR's observations $O_i(S)$ may be primarily derived from local sensing information of the environment. This can include other drive states of AMRs (e.g., within a 10 meter radius) and/or LiDAR-style local distance wall-to-wall sensing (e.g., ranged sensor observations). In some examples, the first AMR 108*a* may have access to the second end destination 132*b* for the second AMR 108*b*. For example, end destinations of AMRs may periodically be communicated via a centralized service to other AMRs. But, inferring the end destinations of other AMRs should not be heavily impacted by communication delays. For example, in cases where the end destination of a nearby AMR is unknown, an end destination can be inferred (e.g., by solving a matching problem). In particular, if the end destination of another AMR is unknown, its future behavior may be highly correlated with its past states; for example, if the other AMR has been observed as recently turning, it is likely to continue turning.

The collection of local observations $O_i(S)$, which in some examples can have varying dimensions, can be projected to token embeddings 202 of the same dimension via a multilayer perceptron (MLP) 204. The information across the token embeddings 202 can be combined via a transformer encoder 206, which can output a new series of token embeddings 208. Analogous to text embeddings in stable diffusion, this new series of token embeddings 208 can be fed into cross-attention layers 210 of a denoising diffusion model, such as a denoising U-Net. The denoising diffusion model can take as input an action trajectory of dimension H×2. The trajectory can be processed via temporal convolutional blocks 212, interspersed with cross-attention layers 210. The cross-attention layers 210 can project the conditioning data to keys and values, while the attention queries can be derived from hidden information of the network. Thus, the denoising diffusion model can generate a denoised trajectory from a noisy trajectory.

For a learning problem for the machine learning model 200, a shared policy can be parameterized across all AMRs. This policy can produce a distribution over open-loop action trajectories for AMR i, which can be conditioned on the observations of AMR i of the current scenario: $p_\theta(u^i|O^i(S))$. Then, the expectation of a joint loss function L can be minimized over action trajectories over scenario samples and policy samples:

$$\min_\theta E_{S\sim P_S} E_{u^i\sim p_\theta(\cdot|O^i(S))} L(S, u^1, \ldots u^N).$$

At a high level, the loss function L can first forward integrate each control trajectory $u^i$ to a state trajectory $x^i$ given a closed-form dynamics model and the initial state $$x_0^i$$

from S. The loss function L can then compute a weighted sum of several differentiable loss terms over the collection of state trajectories $x^1, \ldots, x^N$. Critical loss terms may involve minimizing the distance from $$x_H^i$$

to the end destination $g^i$, penalizing collisions between state trajectories $x^i$, $x^j$ for all i=j, and penalizing collisions between each $x^i$ and the map M.

The inter-AMR collision penalty of the loss function may be available when optimizing a trajectory setting in a centralized setting, but would not be available to traditional model-predictive control (MPC) at deployment. In some examples, since the loss function is minimized using a gradient-based method, all loss terms may be differentiable. When terms of the loss function are differentiable, differentiable gradient-based methods can be used. In other examples, some or all of the loss terms may not be differentiable. When the shared policy is optimizing the action trajectory $u^i$ for the ith AMR (e.g., first AMR 108*a*), may of the loss terms for other AMRs may be irrelevant (e.g., the end destination term for all AMRs j=i). Terms which do not involve $u^i$ may, in some examples, not be computed.

The loss terms can include a goal guidance term, which can penalize the $l_2$-norm distance between the position of the final state $x^i_H$ and the corresponding end destination $g^i$. The loss terms can additionally include an AMR avoidance term which can minimize the sum of inter-AMR collision bubble violations over all timesteps. The bubble, also referred to herein as a buffer, may be a circle centered at the position of each AMR and extending some factor beyond the actual radius of the AMR. When incorporating $z_2$ buffer avoidance, the actual $z_2$ buffer can be approximated as a circle. In some examples, the machine learning model 200 may not only optimize a trajectory that avoids ego AMR $z_2$ buffer violations, but may also avoid other AMR $z_2$ buffer violations. Only preventing ego buffer violations may lead to a more stable training procedure, as the forward-skewed nature of the $z_2$ buffer can mean that only one AMR has to react to prevent a collision. On the other hand, avoiding other AMR $z_2$ buffers can allow for more collaborative behaviors between AMRs.

The loss terms may also include a wall avoidance term, which can take as input a rasterized occupancy grid of permanent obstacles 138. In some examples, pre-processing operations, such as dilating obstacles 138 to add a wall-avoidance margin and round corners to provide better gradients to the machine learning model 200, can be performed. The processed occupancy grid can then converge to a distance-to-freespace representation. For a given trajectory $x^i$, the machine learning model 200 can linearly interpolate the distance grid based on each position across in $x^i$, and can return the sum of all violations. This can also be implemented using the safety buffer. For example, evenly sampled points along the perimeter can be selected from the circular approximation of the safety buffer. These sampled points can be used as positions to interpolate the distance grid.

In some examples, the loss terms may also include a terminal direction term. The terminal direction term can penalize the angular deviation of the heading at x from the bearing to the end destination $g^i$. The terminal direction term can encourage planning trajectories which are likely to leave the first AMR 108*a* in a good state to make subsequent process. The loss terms may also include a terminal velocity term. The terminal velocity term can ensure that the generated trajectory does not end with a velocity that causes the AMR to overshoot the end destination $g^i$. The loss function can therefore compute the max allowable velocity given the distance from $$x^i_H$$

to $g^i$ and can penalize any excess. The loss terms may also include a minimum effort term. The minimum effort term can penalize the weighted sum-of-squares of the control $u^i$. The loss function may more heavily penalize effort later in the trajectory to encourage early motion. This may be important for closing the control loop, as typically the AMR may not execute the entire generated trajectory, but only an initial subsection. In some examples, the loss terms may also include a function (e.g., a cost function) that can evaluate the free space in front of the AMR at its final state.

Figure 3:
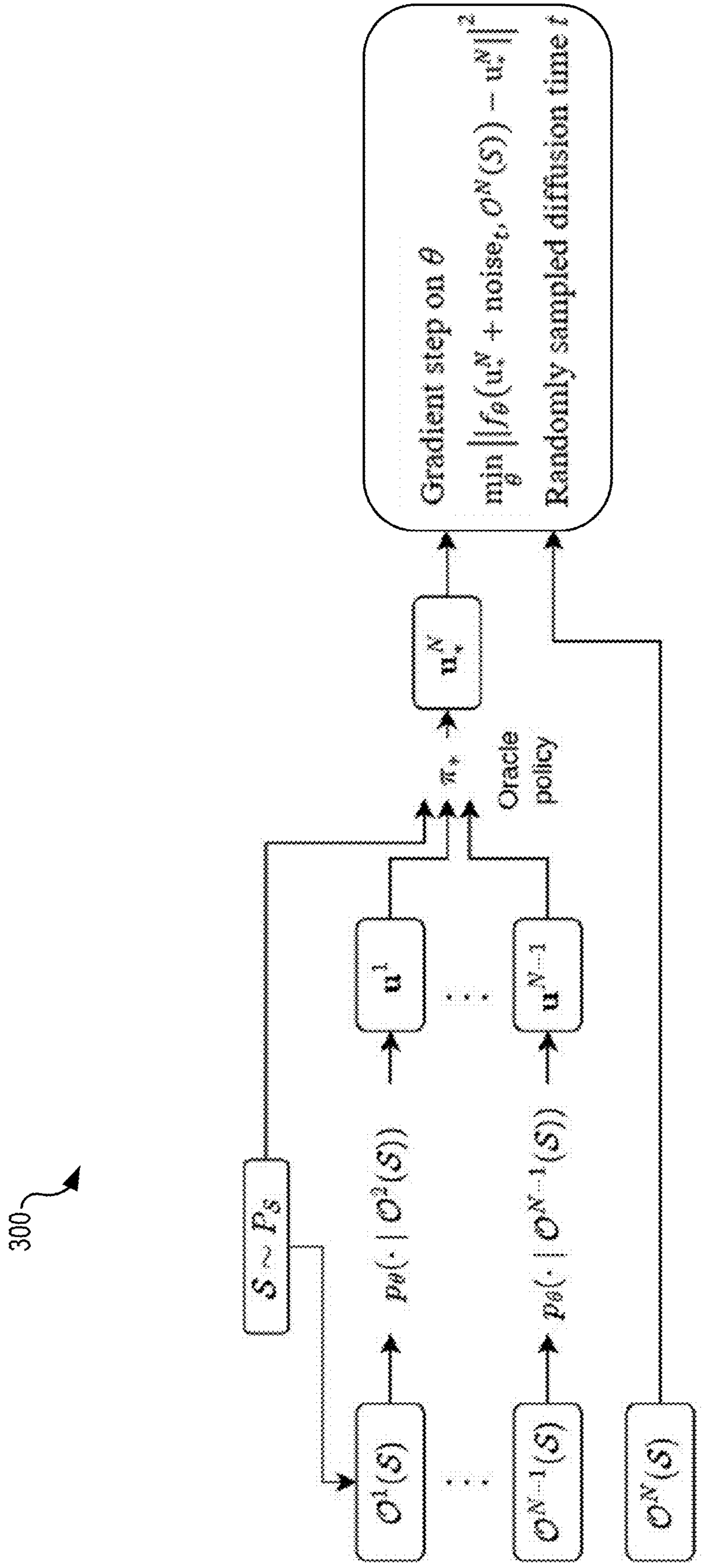
FIG. 3 illustrates an example training procedure for a machine learning model used to implement learned implicit coordination of autonomous mobile robots, according to embodiments of the present disclosure.

FIG. 3 illustrates an example training procedure 300 for a machine learning model used to implement learned implicit coordination of autonomous mobile robots, according to embodiments of the present disclosure. The learning problem described above for the machine learning model 200 may not be immediately tractable for training modern generative models. Such approaches may generally require a dataset of ground-truth samples, whose likelihood can then be maximized by updating θ. In some examples, the aforementioned learning problem may provide no trajectory samples from which the machine learning model can be trained. Thus, an oracle policy can be used to provide trajectory samples to regress upon. For example, a training process may involve having a currently trained version of the machine learning model generate trajectories for all nearby agents to AMR N, including AMR N. The oracle policy can then compute an improved trajectory or an optimal trajectory for AMR N, while keeping the other AMR trajectories fixed. The machine learning model can then be updated by comparing the improved trajectory or the optimal trajectory to a generated trajectory for AMR N (e.g., a learning gradient). This process can be repeated in a training loop. With each improved iteration of the machine learning model, trajectories can be generated, the oracle policy optimization can be run, and the machine learning model can be updated. In this way, the machine learning model 200 can be continually taught on how the oracle policy may move an AMR. The oracle policy can therefore allow for training a conditional diffusion policy. Data for training can be generated by the diffusion model. N can be considered as the ego AMR (e.g., the AMR on which the machine learning model is executing).

The oracle policy π*, given a fixed scenario S, can compute the optimal trajectory $$u^i_*$$

for an AMR i, assuming a fixed action trajectory sample $u^j$ for all other AMRs j=i. The oracle policy may have omniscient knowledge of what all other AMRs plan to do in a given situation. This is not available at inference time, so the oracle policy may not be executed on-robot. But at training time, the required centralized information can be available to execute the oracle policy. The real policy $p_\theta$ that is used at inference time (e.g., on-robot) can be trained to imitate π* using only local sensing data.

The oracle policy can be implemented using a first-order solver which can minimize the $$\text{loss function } L: u^i_* := \pi_*(S, u^{-1}) \approx \underset{u^i}{\operatorname{argmin}} L(S, u^1, \ldots, u^N).$$

Here, L may be the weighted sum of the differentiable loss terms (or, in other examples, any other suitable loss function). The speed of the oracle solver may be paramount, as trajectories may need to be optimized frequently during training. The minimization problem of the oracle policy can be solved in parallel over a batch of initial trajectories. In some examples, the Adaptive Movement Estimation (Adam) optimization algorithm can be used to solve the minimization problem, which can be further parallelized across multiple AMRs. Between each gradient step, a dynamics-aware projection step can be performed to help avoid local minima. For example, to avoid falling into local minima, a batch (e.g., 30) of randomly generated control trajectories can be initialized for each optimization problem. For each initialization, a random starting and ending angular velocity and/or acceleration can be sampled. Linear interpolation can be applied between the start and end samples. Other methods for generating control trajectory initializations can also be used.

Because of the gradient-based optimizer, it may be important to avoid gradient plateaus to prevent issues for the longitudinal acceleration and/or velocity of the AMR. For instance, when integrating forwards $u^i$ to get $x^i$, the cumulative sum of the accelerations can be taken and then clamped to the maximum and minimum velocities of the drives. For a specific time index $t \in 1, \ldots, H$ where the velocity is at its maximum, if the acceleration at $t-1$ is greater than zero, the resulting first order-effect on the state rollout of changing the acceleration may be zero. In other words, this can result in a gradient plateau. Many more initialization points may be needed to avoid falling into a local minima. Thus, the dynamics-aware projection step can be used to project the acceleration in such cases back to zero. The same techniques may apply for decelerating at zero velocity.

In some examples, the oracle policy may not involve avoiding unperceived obstacles. This can help make the ultimate learning problem easier. At inference (e.g., when executed on-robot after training), the ego AMR may only use local sensing information. In particular, the ego AMR may only perceive other AMRs whose starting position is within, for example, a 10 meter radius of the ego AMR. Any other AMR that starts outside this radius and then strays into the path of the ego AMR may be impossible to consider in trajectory generation. Thus, the oracle policy may not involve avoiding the trajectories of such drives when optimizing, as from the perspective of the learning problem, this can add a lot of noise to the optimal trajectory without providing much underlying signal. Thus, when formulating the loss function L, AMRs that start outside of a particular radius of the ego AMR can be pruned out.

The training procedure 300 illustrated in FIG. 3 can involve, considering an arbitrary ego AMR i, first sampling a random scenario $S \sim P_S$. This scenario S can be an instantaneous snapshot of all AMR states and goals (e.g., end destinations). Second, an action trajectory $u^j \sim p_\theta(\cdot|O^j(S))$ can be sampled under the current diffusion model policy for all other AMRs $j \neq i$. Third, the optimal ego trajectory $$u_*^i$$

can then be generated using the oracle policy $\pi^*$, given S and $u^{-1}$. Fourth, A standard diffusion update can then be performed on $\theta$ to increase the likelihood of $$p_\theta(u_*^i|O^i(S)).$$

In some examples, the oracle action trajectories can be determined by the policy or learned model that other AMRs are following, which can change over the course of training. This may result in continually recomputing oracle trajectories in the training loop based on newly generated trajectories from other AMRs. In some examples, the oracle policy step may be the most computationally expensive step, as it may involve solving an optimization problem (e.g., minimizing a loss function). Therefore, in some examples, the optimal ego trajectories may be cached, and the second and third steps may only be recomputed every few epochs. After performing the training procedure 300 of FIG. 3, the resulting trained machine learning model can be used at inference time (e.g., executed on-robot, using only local sensing information as input), as is further described below in relation to FIG. 4.

Figure 4:
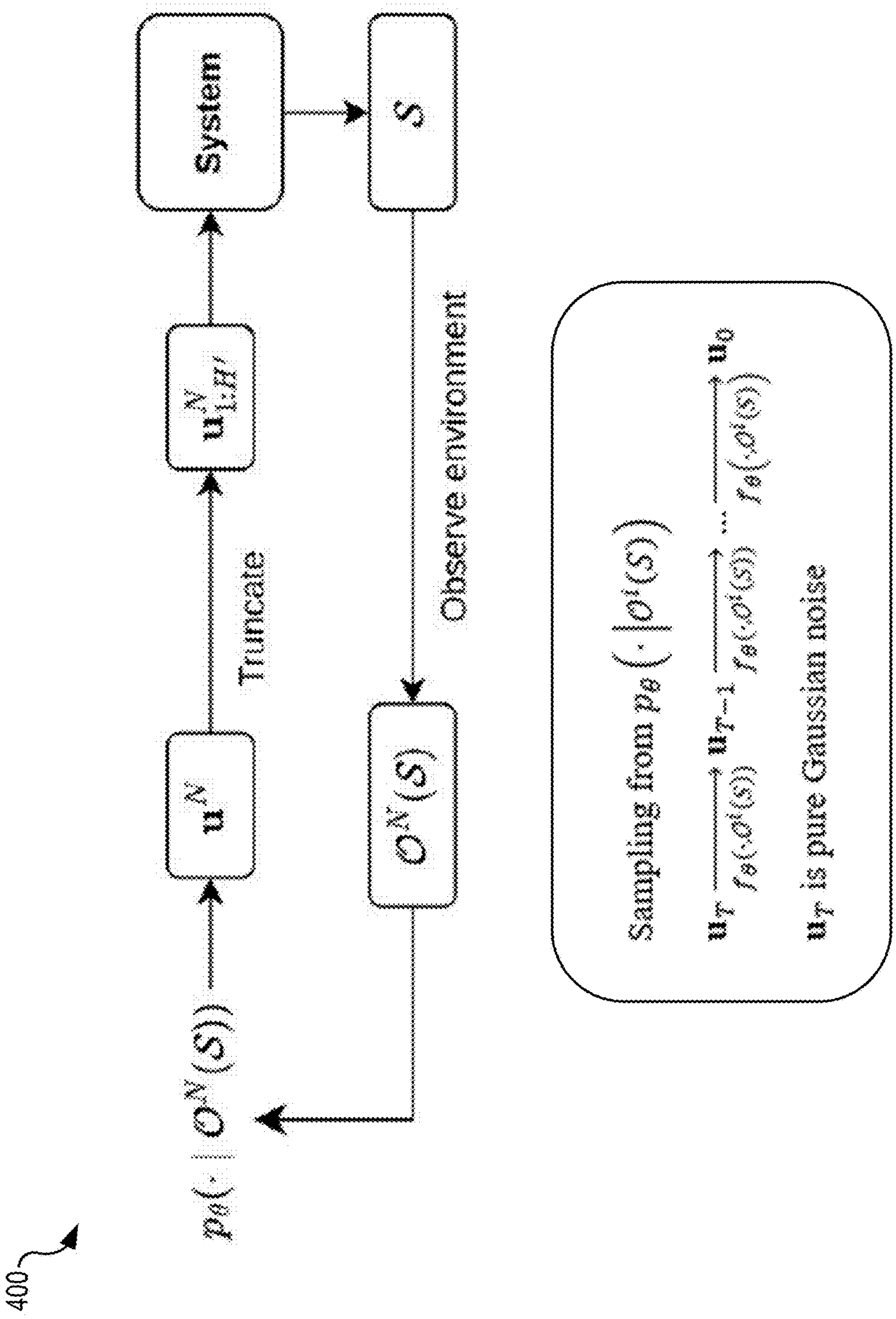
FIG. 4 illustrates an example inference procedure for a machine learning model used to implement learned implicit coordination of autonomous mobile robots, according to embodiments of the present disclosure.

FIG. 4 illustrates an example inference procedure 400 for a trained machine learning model used to implement learned implicit coordination of autonomous mobile robots, according to embodiments of the present disclosure. At inference time, plans can be executed from a trained model $p_\theta$ in a receding-horizon fashion. $H' << H$ can denote a replanning interval. The following steps can be repeated for an arbitrary ego AMR i. First, local sensor observations $O^i(S)$ of the environment can be collected by the ego AMR i. Second, an open loop control trajectory $u^i \sim p_\theta(\cdot|O^i(S))$ can be sampled. Third, the ego AMR i can execute a subsequence $$u^i_{:H'}$$

of the action sequence. The trained model $p_\theta$ can therefore be a learned model predictive controller, with the key ability to implicitly predict and account for what other AMRs are likely to do in a given situation. A comparison between the learned model predictive controller and traditional model predictive controllers is described in more detail below in relation to FIG. 5.

Figure 5:
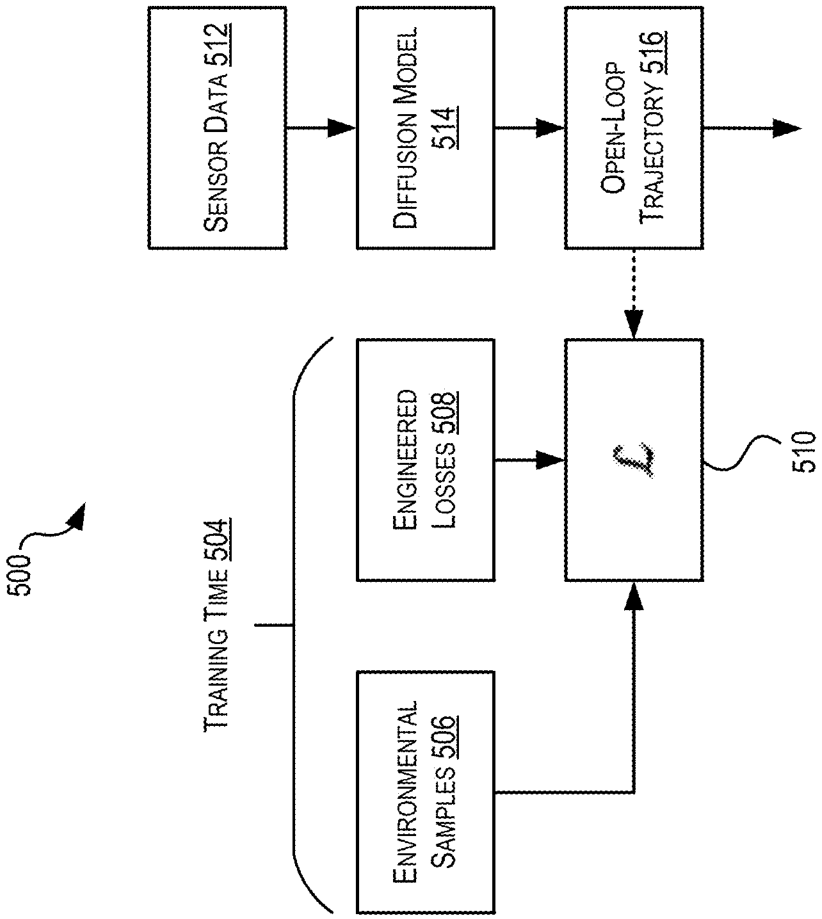
FIG. 5 illustrates example learned model-predictive control, according to embodiments of the present disclosure.

FIG. 5 illustrates example learned model-predictive control 500, according to embodiments of the present disclosure. Learned model-predictive control 500 can involve implementing the techniques described herein (e.g., learned implicit coordination using machine learning). In learned model-predictive control 500, instead of solving an optimization problem at inference time to minimize losses, as is performed in conventional model-predictive control, the optimization can instead be solved at training time 504 using the oracle policy to learn a diffusion model 514 to imitate these oracle trajectories. For example, at training time 504, environmental samples 506 and engineered losses 508 can be used to train the diffusion model 514 by solving the optimization problem (e.g., minimizing the loss function 510) to generate engineered losses 508 on which the diffusion model 514 is trained. The diffusion model 514 can be an example of the trained machine learning model 112 of FIG. 1.

The oracle policy can not only be used to minimize the ego-centric loss function 510, but can also account for centralized information only available at training time. This can include the rollouts of other AMRs under the learned policy, such as environmental samples 506 (e.g., simulated and/or historical trajectories and behaviors of historical or simulated AMRs). Such environmental samples 506 may be impossible to incorporate into a traditional model-predictive control that solves optimizations at runtime. For instance, traditional model-predictive control cannot learn how desired outcomes encoded in a loss function interact with such environmental samples 506. In contrast, the learned model-predictive control 500 can do so during training time 504 by simulating instances of policies in the environmental samples 506, or by observing a recorded instance. The resulting loss (e.g., from minimizing the loss function 510) of an open loop trajectory can then be used to feed back a gradient into the next learning step. After training time 504, the trained diffusion model 514 can generate an open-loop trajectory 516 based solely on locally-sensed sensor data 512, relying on the engineered losses 508 and minimization of loss function 510 during training time 504 without performing optimization problems at inference time. For example, the diffusion model 514 can use the simulated instances or the recorded instances of policies to score trajectories to select a most optimal trajectory for the AMR. The diffusion model 514 may learn from the engineered losses 508 and the loss function 510 during training time, but may not minimize the loss function 510 at inference time. For example, the diffusion model 514 may not have access to the loss function 510 at inference time. That is, the open-loop trajectory 516 generated by the diffusion model 514 can satisfy the loss function 510 without actually using the loss function 510 in generation of the open-loop trajectory 516.

The resulting behavior of the trained diffusion model 514, when executed on multiple AMRs in an environment, can produce highly coordinated behavior without centralized communication. AMRs, each executing the trained diffusion model 514, can discover coordination rules learned during training time 504 to apply during execution based only on the local sensor data 512. Throughput and movement efficiency (e.g., speed) can therefore be higher for AMRs executing the trained diffusion model 514. Behavior that may be impossible to achieve with hand-crafted rules can naturally emerge. For example, AMRs executing the trained diffusion model 514 to generate trajectories can exhibit behaviors such as staying on the right side of an organically formed "traffic" lane, yielding at intersections, avoiding intersections between AMR buffers, etc.

Figure 6:
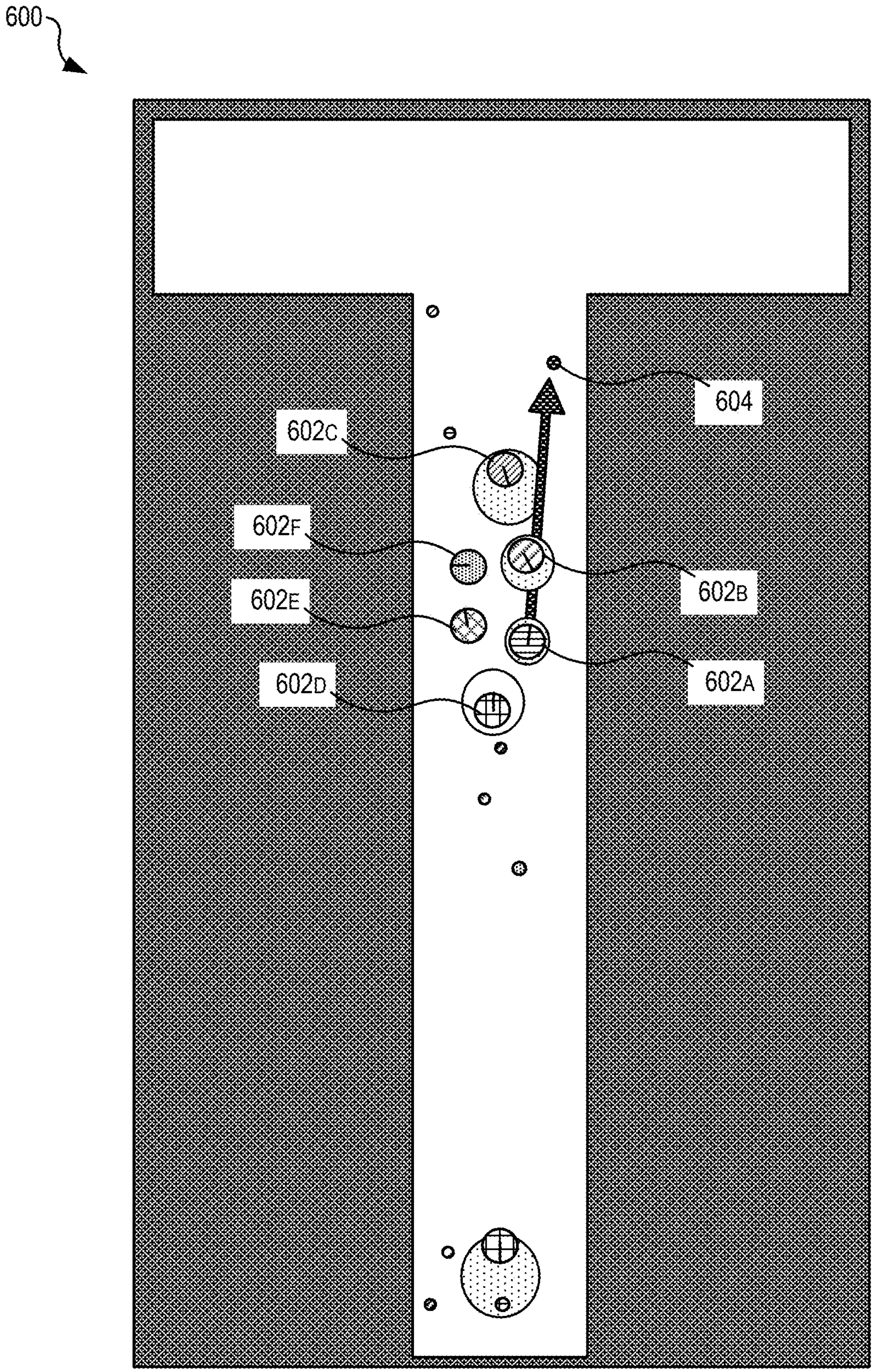
FIG. 6 illustrates example autonomous mobile robots navigating using learned implicit coordination at a first time, according to embodiments of the present disclosure.

In some examples, some AMRs may temporarily sacrifice their own progress to let other AMRs pass until an opportunity arises to resume progress towards their own goals. Such an example is depicted in FIG. 6, which illustrates example autonomous mobile robots navigating using learned implicit coordination at a first time 600, according to embodiments of the present disclosure. For example, a first AMR 602*a* can have a goal to go north to its end destination 604. Other AMRs, such as AMRs 602*b-c*, may block the path of the first AMR 602*a* to the end destination 604. As each of the AMRs 602*a-c* may be executing machine learning models that implement learned implicit coordination, the first AMR 602*a* may generate a new trajectory that sacrifices its own goal to turn around and let the other AMRs 602*b-c*. This is depicted in FIG. 7 at second time 700, in which the first AMR 602*a* has changed directions and is moving southward (e.g., away from its end destination 604 to the north).

Figure 7:
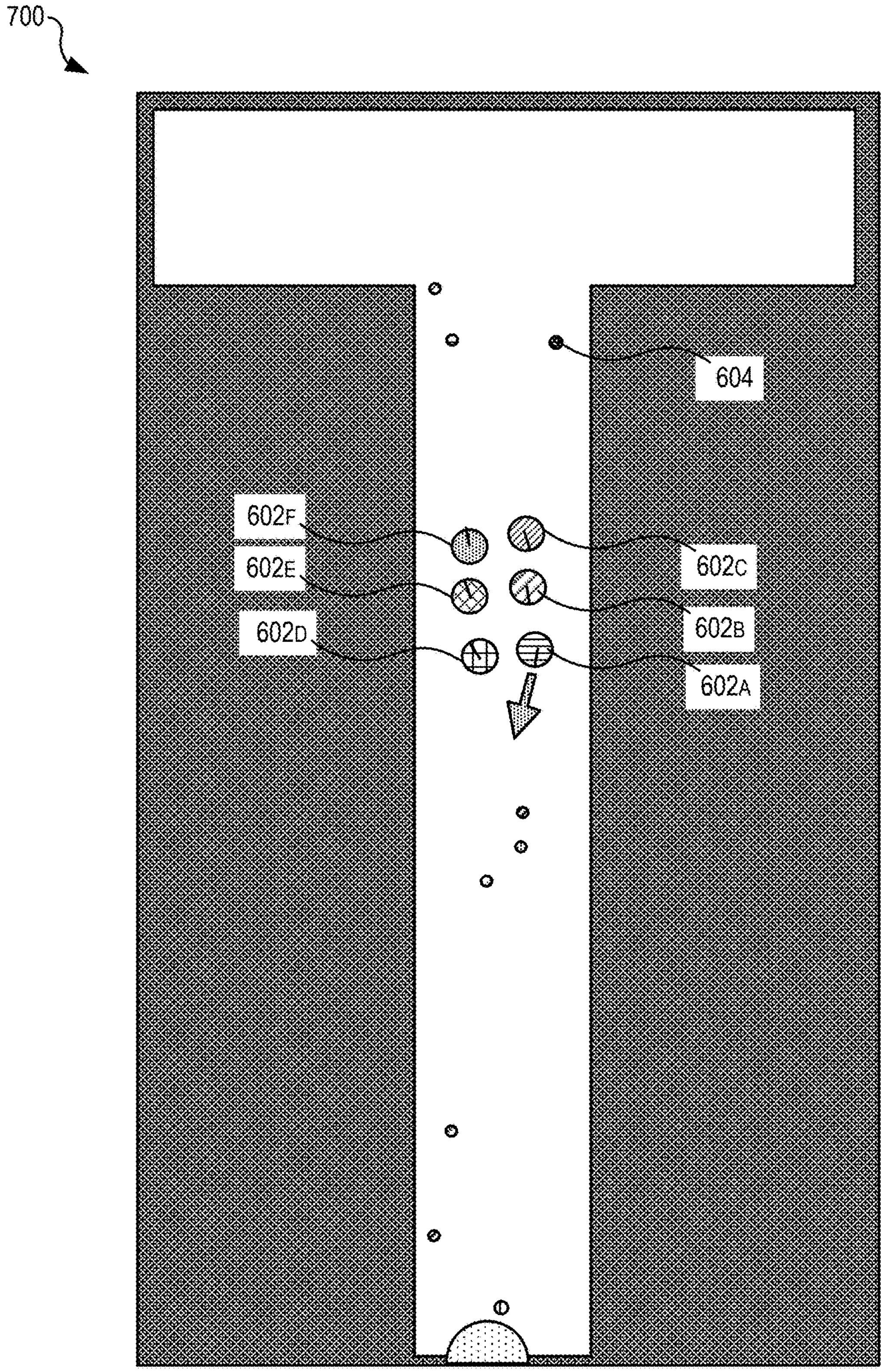
FIG. 7 illustrates example autonomous mobile robots navigating using learned implicit coordination at a second time, according to embodiments of the present disclosure.
Figure 8:
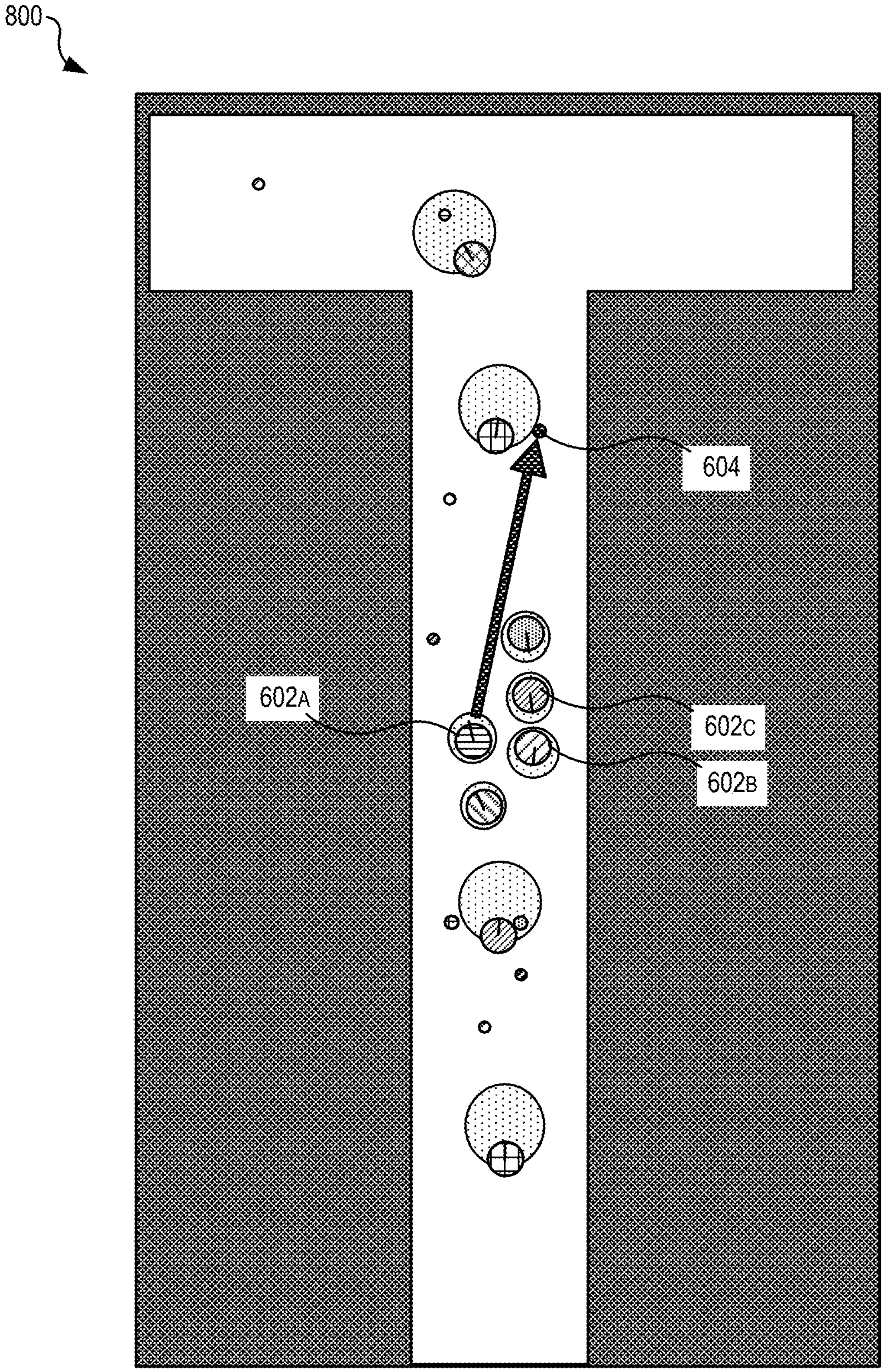
FIG. 8 illustrates example autonomous mobile robots navigating using learned implicit coordination at a third time, according to embodiments of the present disclosure.

FIG. 7 additionally depicts AMRs 602*a-f* independently and collaboratively forming traffic lanes, with first AMR 602*a*, second AMR 602*b*, and third AMR 602*c* each moving southward on a right side of a hallway, and fourth AMR 602*d*, fifth AMR 602*e*, and sixth AMR 602*f* each moving northward on a left side of the hallway. Then, at a third time 800 depicted in FIG. 8, the first AMR 602*a* may detect an opportunity to change sides of the traffic lane due to an absence of other AMRs or obstacles in front of the first AMR 602*a*. Thus, the first AMR 602*a* may then resume progress towards its end destination 604. Such platooning behavior can naturally occur, despite the loss function not including cost terms explicitly encouraging such behavior. Further, after exiting the traffic lanes, the AMRs 602 may return to the center of the hallway to maximize speed without violating AMR buffers.

FIG. 9 illustrates an example flowchart showing a process 900 for implementing techniques related to using machine learning for implicit learned coordination of autonomous mobile robots, according to embodiments of the present disclosure. In some examples, the computer system 106 of FIG. 1, the AMR 108 of FIGS. 1-2, the AMRs 602 of FIGS. 6-8, or the computer system 1002 or AMR 1004 of FIG. 10 may perform some or all parts of the process 900.

The process 900 can begin at block 902 by detecting, by a sensor of the AMR, a state of an environment around the AMR. For example, the state of the environment can include at least one of an obstacle or a position of one or more AMRs (e.g., nearby in a facility). The sensor data can include at least one of optical data or light detection and ranging (LiDAR) data. In some examples, the AMR may also receive a set of end destinations for other AMRs in the facility. The AMR can determine, from the set of end destinations, a subset of end destinations identified as being associated with the other AMRs represented in the sensor data.

At block 904, the process 900 can involve the AMR generating, by at least using a trained machine learning model and based at least in part on the sensor data and a goal for the AMR, a trajectory for achieving the goal. The goal may be, in some examples, an end destination. The trajectory may involve traversing to the end destination. The trained machine learning model may, in some examples, be a diffusion model. The trained machine learning model may, in some examples, generate the trajectory additionally based at least in part on the subset of end destinations for other AMRs represented in the sensor data. Alternatively, if the end destinations for the other AMRs represented in the sensor data is unavailable, the AMR may determine, based at least in part on detecting sensor data representing the other AMRs over time, a projected trajectory for the other AMRs. The trained machine learning model can then generate the trajectory based at least in part on the projected trajectory for the other AMRs represented in the sensor data. In some examples, the trained machine learning model can generate the trajectory by sampling noise (e.g., pure Gaussian noise). The trained machine learning model can then denoise, based at least in part on the sensor data and the end destination, the noise to generate the trajectory. The trajectory can include (i) a route between a current position of the AMR and the end destination and (ii) one or more velocities for the AMR at individual points along the route.

The trained machine learning model may be generated by, before runtime (e.g., before execution on the AMR), generating simulated trajectories for a set of AMRs (e.g., simulated AMRs or historical AMRs, such as recordings of AMRs) based at least in part on other sensor data (e.g., simulated data or historical data). The simulated trajectories may minimize a joint loss function across the set of AMRs. The trained machine learning model can be generated by training a machine learning model on the simulated trajectories and simulated sensor data.

In some examples, the joint loss function can include at least one of a minimum distance between a current position of at least one AMR in the set of AMRs and an associated end destination in a sampled scenario, a first penalty for collisions between the at least one AMR and one or more other AMRs in the set of AMRs (e.g., other simulated or historical AMRs) in the sampled scenario, or a second penalty for collisions between the at least one AMR and obstacles in the sampled scenario. The first penalty may involve an overlap between a first radius around the at least one AMR and a second radius around the one or more other AMRs. The radius may be a "safety buffer" for the AMRs. Avoiding AMR safety buffer interactions may prevent AMRs from colliding or deadlocking. In some examples, the joint loss function may also include at least one of a third penalty for angular deviation from an end destination or a maximum velocity within a predefined distance from the end destination. In some examples, a policy (e.g., the oracle policy) can be applied to the simulated trajectories to generate corrected trajectories. The corrected trajectories may exhibit implicit coordination behavior as encoded by the policy. The machine learning model can then be trained on the corrected trajectories to learn implicit coordinated behavior.

At block 906, the process 900 can involve the AMR executing at least an initial portion of the trajectory. In some examples where the sensor data is first sensor data received at a first time and the trajectory is a first trajectory, the sensor can then detect second sensor data received at a second time. The second sensor data can indicate a second position of the obstacle or the other AMRs in the facility, with the second position being different than the first position indicated in the first sensor data. The trained machine learning model can then generate, based at least in part on the second sensor data, a second trajectory for traversing to the end destination. The AMR can then terminate execution of the first trajectory and execute at least an initial portion of the second trajectory.

Figure 10:
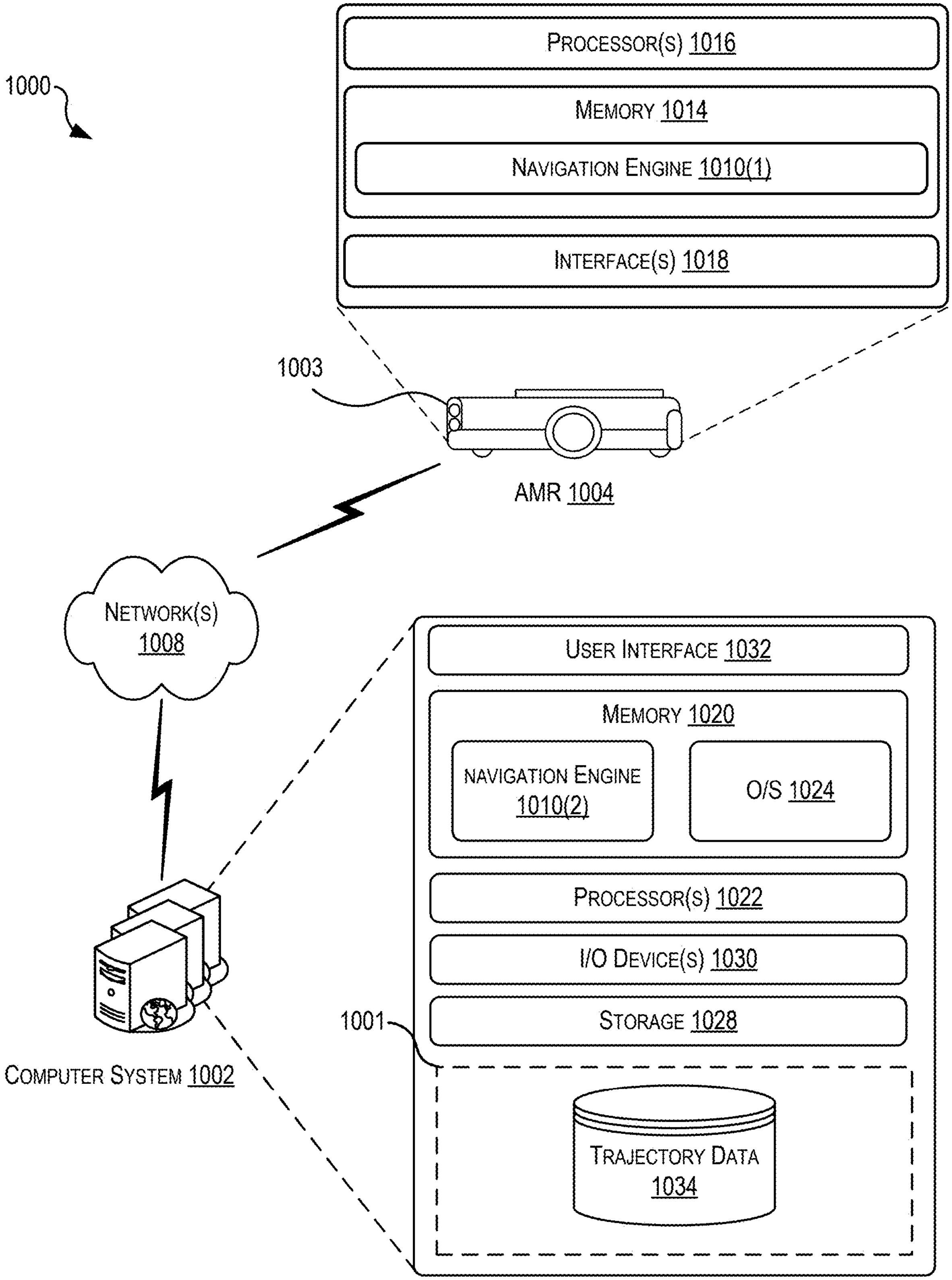
FIG. 10 illustrates an environment in which various embodiments can be implemented.

FIG. 10 illustrates an example schematic architecture for implementing techniques relating to learned implicit coordination for AMRs in a facility using machine learning, according to embodiments of the present disclosure. The architecture 1000 may include a computer system 1002 (e.g., the computer system 106 described herein) in communication with an AMR 1004 (e.g., the AMR 108 described herein) via one or more networks 1008 (hereinafter, "the network 1008").

The AMR 1004 may be operable to interact with the computer system 1002. The AMR 1004 may include a sensor device 1003 such as an optical sensor, a distance sensor, an RFID sensor, a LiDAR sensor, or any other type of sensor.

The AMR 1004 may include a memory 1014 and processor(s) 1016. In the memory 1014 may be stored program instructions that are loadable and executable on the processor(s) 1016, as well as data generated during the execution of these programs. Depending on the configuration and type of AMR 1004, the memory 1014 may be volatile (such as random access memory ("RAM")) and/or non-volatile (such as read-only memory (ROM), flash memory, etc.).

In some examples, the memory 1014 may include a version of a navigation engine 1010 (e.g., 1010(1)). The navigation engine 1010(1) may interact with the computer system 1002 via the network 1008. The AMR 1004 may also include one or more interfaces 1018 to enable communication with other devices, systems, and the like. The navigation engine 1010(1), whether embodied in the AMR 1004 or the computer system 1002, may be configured to perform the techniques described herein. For example, the navigation engine 1010 can include a diffusion model trained to implement learned implicit coordination to generate trajectories using locally sensed data. In an example, the navigation engine 1010 can include any other suitable devices, engines, modules, models, and the like.

Turning now to the details of the computer system 1002, the computer system 1002 may include one or more computer system computers, perhaps arranged in a cluster of servers or as a server farm, and may host web service applications. The function of the computer system 1002 may be implemented a cloud-based environment such that individual components of the computer system 1002 are virtual resources in a distributed environment.

The computer system 1002 may include at least one memory 1020 and one or more processing units (or processor(s)) 1022. The processor 1022 may be implemented as appropriate in hardware, computer-executable instructions, software, firmware, or combinations thereof. Computer-executable instruction, software, or firmware implementations of the processor 1022 may include computer-executable or machine-executable instructions written in any suitable programming language to perform the various functions described. The memory 1020 may include more than one memory and may be distributed throughout the computer system 1002. The memory 1020 may store program instructions that are loadable and executable on the processor(s) 1022, as well as data generated during the execution of these programs. Depending on the configuration and type of memory including the computer system 1002, the memory 1020 may be volatile (such as RAM and/or non-volatile (such as read-only memory ("ROM"), flash memory, or other memory)). The memory 1020 may include an operating system 1024 and one or more application programs, modules, or services for implementing the features disclosed herein including at least a version of the navigation engine 1010 (e.g., 1010(2)). For example, the navigation engine 1010(2) may perform the functionality described herein.

The computer system 1002 may also include additional storage 1028, which may be removable storage and/or non-removable storage including, but not limited to, magnetic storage, optical disks, and/or tape storage. The disk drives and their associated computer-readable media may provide non-volatile storage of computer-readable instructions, data structures, program modules, and other data for the computing devices. The additional storage 1028, both removable and non-removable, is an example of computer-readable storage media. For example, computer-readable storage media may include volatile or non-volatile, removable, or non-removable media implemented in any suitable method or technology for storage of information such as computer-readable instructions, data structures, program modules, or other data. As used herein, modules, engines, applications, and components may refer to programming modules executed by computing systems (e.g., processors) that are part of the computer system 1002 and/or part of the AMR 1004.

The computer system 1002 may also include input/output (I/O) device(s) and/or ports 1030, such as for enabling connection with a keyboard, a mouse, a pen, a voice input device, a touch input device, a display, speakers, a printer, or other I/O device.

In some examples, the computer system 1002 may also include one or more user interface(s) 1032. The user interface 1032 may be utilized by an operator, curator, or other authorized user to access portions of the computer system 1002. In some examples, the user interface 1032 may include a graphical user interface, voice interfaces, web-based applications, programmatic interfaces such as APIs, or other user interface configurations.

The computer system 1002 may also include a data store 1001. In some examples, the data store 1001 may include one or more databases, data structures, or the like for storing and/or retaining information associated with the computer system 1002 and which, in some examples, may be accessible by the AMR 1004. The navigation engine 1010 is communicatively coupled (e.g., via a wired connection or a wireless connection) to the data store 1001. The data store

1001 includes trajectory data 1034. In an example, the data store 1001 can include any other suitable data, databases, libraries, and the like.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers, and business application servers. The server(s) also may be capable of executing programs or scripts in response to requests from user devices, such as by executing one or more Web applications that may be implemented as one or more scripts or programs written in any programming language, such as Java®, C, C#, or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired)), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media, computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A system, comprising:

a computer system configured to at least:

determine end destinations for individual autonomous mobile robots (AMRs) traversing a facility; and generate a trained machine learning model by at least:

generating, based at least in part on simulated sensor data for a set of AMRs, a set of simulated trajectories for individual AMRs of the set of AMRs that minimize a joint loss function across the set of AMRs, wherein the joint loss function comprises at least one of a penalty for angular deviation from an end destination or a maximum velocity within a predefined distance from the end destination; and training the machine learning model on the set of simulated trajectories and the simulated sensor data; and an AMR operably coupled to the computer system and comprising a sensor, the AMR configured to:

receive an end destination for the AMR, in the facility from the computer system;

detect, by the sensor, sensor data indicating a position of at least one of an obstacle or one or more other AMRs in the facility;

generate, by at least using the trained machine learning model and based at least in part on the sensor data and the end destination, a trajectory for the AMR; and traverse the facility by at least executing an initial portion of the trajectory.

2. The system of claim 1, wherein the trained machine learning model comprises a diffusion model.

3. The system of claim 1, wherein in the penalty is a first penalty, and wherein the joint loss function comprises at least one of a minimum distance between a current position of at least one AMRs of the set of AMRs and an associated simulated end destination, a second penalty for collisions between the at least one AMRs and one or more other AMRs in the set of AMRs, or a third penalty for collisions between the at least one AMR and simulated obstacles.

4. The system of claim 1, wherein the AMR is further configured to:

receive, from the computer system, a set of end destinations for other AMRs in the facility; and determine, from the set of end destinations, a subset of end destinations identified as being associated with one or more other AMRs represented in the sensor data, wherein the trained machine learning model is further configured to generate the trajectory for the AMR based at least in part on the subset of end destinations for the one or more other AMRs.

5. A method implemented by an autonomous mobile robot (AMR), the method comprising:

detecting, by a sensor of the AMR, sensor data indicating a state of an environment around the AMR;

generating, by at least using a trained machine learning model and based at least in part on the sensor data and a goal for the AMR, a trajectory for achieving the goal, wherein the trained machine learning model is generated by at least training a machine learning model based on simulated trajectories generated for a set of AMRs that minimize a joint loss function across the set of AMRs, wherein the joint loss function comprises at least one of a penalty for angular deviation from an end destination or a maximum velocity within a predefined distance from the end destination; and executing at least an initial portion of the trajectory.

6. The method of claim 5, wherein the penalty comprises a first penalty, and wherein the joint loss function comprises at least one of a minimum distance between a current position of at least one AMR of the set of AMRs and an associated end destination, a second penalty for collisions between the at least one AMR and one or more other AMRs in the set of AMRs, or a third penalty for collisions between the at least one AMR and obstacles.

7. The method of claim 6, wherein the second penalty further comprises an overlap between a first radius around the at least one AMR and a second radius around the one or more other AMRs.

8. The method of claim 5, wherein the goal is a first goal, and wherein the method further comprises:

receiving a second goal for a second AMR in the environment, wherein the second AMR is represented in the sensor data, wherein the trained machine learning model is further configured to generate the trajectory based at least in part on the second goal for the second AMR.

9. The method of claim 5, further comprising:

determining, based at least in part on detecting sensor data representing a third AMR in the environment over time, a projected trajectory for the third AMR, wherein the trained machine learning model is further configured to generate the trajectory based at least in part on the projected trajectory for the third AMR.

10. The method of claim 5, wherein the trained machine learning model is further generated by at least training the machine learning model on the simulated trajectories.

11. The method of claim 5, wherein the sensor data is first sensor data received at a first time, the state is a first state, and the trajectory is a first trajectory, wherein the first state of the environment indicates a first position of an obstacle in the environment, and wherein the method further comprises:

detecting, by the sensor, second sensor data received at a second time, wherein the second sensor data indicates a second state of the environment that comprises a second position of the obstacle;

generating, by at least using the trained machine learning model and based at least in part on the second sensor data, a second trajectory for achieving the goal; and terminating execution of the first trajectory and executing at least an initial portion of the second trajectory.

12. The method of claim 5, wherein the sensor data comprises at least one of optical data or light detection and ranging (LiDAR) data.

13. The method of claim 5, wherein generating the trajectory further comprises:

sampling, by at least using the trained machine learning model, noise; and denoising, by at least using the trained machine learning model and based at least in part on the sensor data and the goal, the noise to generate the trajectory.

14. The method of claim 5, wherein the goal comprises an end destination, and wherein the trajectory comprises (i) a route between a current position of the AMR and the end destination and (ii) one or more velocities for the AMR at individual points along the route.

15. The method of claim 5, wherein the trained machine learning model comprises a diffusion model.

16. An autonomous mobile robot (AMR), comprising:

a sensor device configured to detect sensor data indicating a state of an environment around the AMR;

one or more processors; and one or more memories storing instructions that, upon execution by the one or more processors, configure the AMR, to:

generate, by at least using a trained machine learning model and based at least in part on the sensor data and a goal, a trajectory for achieving the goal, wherein the trained machine learning model is generated by at least training a machine learning model based on simulated trajectories generated for a set of AMRs that minimize a joint loss function across the set of AMRs, wherein the joint loss function comprises at least one of a penalty for angular deviation from an end destination or a maximum velocity within a predefined distance from the end destination; and execute at least an initial portion of the trajectory.

17. The AMR of claim 16, wherein the trained machine learning model is further generated by at least:

generating the simulated trajectories based on simulated sensor data for the set of AMRs; and training the machine learning model on the simulated trajectories and the simulated sensor data.

18. The AMR of claim 17, wherein the trained machine learning model is further generated by at least:

correcting, by at least using a policy, the simulated trajectories to generate corrected trajectories; and training the machine learning model on the corrected trajectories.

19. The ARM of claim 17, wherein the trained machine learning model comprises a diffusion model.

20. The AMR of claim 16, wherein the penalty comprises a first penalty, and wherein the joint loss function comprises at least one of a minimum distance between a current position of at least one AMR of the set of AMRs and an associated end destination, a second penalty for collisions between the at least one AMR and one or more other AMRs in the set of AMRs, or a third penalty for collisions between the at least one AMR and the one or more other AMRs.

* * * * *